(12) United States Patent  (10) Patent No.: US 8,470,161 B2
Cooper  (45) Date of Patent: Jun. 25, 2013

(54) BIOMASS PRODUCTION AND HARVESTING SYSTEM

(76) Inventor: Stuart D. Cooper, Boynton Beach, FL (US)

( * ) Notice: Subject to any disclaimer, the term of this patent is extended or adjusted under 35 U.S.C. 154(b) by 43 days.

(21) Appl. No.: 13/154,437

(22) Filed: Jun. 6, 2011

(65) Prior Publication Data

US 2012/0199494 A1  Aug. 9, 2012

Related U.S. Application Data (60) Provisional application No. 61/351,737, filed on Jun. 4, 2010.

(51) Int. Cl.
*C02F 1/46* (2006.01)
(52) U.S. Cl.
USPC .................. 205/701; 205/742; 205/757
(58) Field of Classification Search
USPC .................. 205/701, 742–757; 204/559–570
See application file for complete search history.

(56) References Cited

U.S. PATENT DOCUMENTS

| | | | |
|---|---|---|---|
| 3,783,114 A * | 1/1974 | Ishii et al. | 205/695 |
| 2005/0011770 A1* | 1/2005 | Katsuyoshi et al. | 205/742 |
| 2010/0233761 A1* | 9/2010 | Czartoski et al. | 435/71.1 |
| 2011/0095225 A1* | 4/2011 | Eckelberry et al. | 252/182.12 |

* cited by examiner

*Primary Examiner* — Arun S Phasge
(74) *Attorney, Agent, or Firm* — Christopher J. Vandam, PA; Chris Vandam (57) ABSTRACT

A self-contained system which promotes the multiplication of algae from either salt water or fresh water sources as a feedstock. This process inspires a direct output of lipids for bio-diesel fuel as well as a significant raw algae yield which can be further processed into additional bio-fuel as well as other valuable resources. In addition to inspiring a direct output of algal lipids for bio-diesel, the system generates massive raw algae biomass output that can be directly utilized as an agent for efficiently cleaning up oil spills.

11 Claims, 3 Drawing Sheets

BIOMASS PRODUCTION AND HARVESTING SYSTEM

This application claims benefit to, and incorporates in its entirety, provisional application filed 4 Jun. 2010 having application No. 61/351,737 filed by common inventor Stuart D. Cooper.

BACKGROUND OF THE INVENTION

1. Field of the Invention

The present invention relates to energy production, and more particularly, to algae based derivation of varied forms of energy and other valuable byproducts.

2. Description of the Related Art

Several designs for algae based energy production systems and methods have been designed in the past. None of them, however, includes a means to cultivate common natural forms of algae in fresh, brackish and salt water and extract lipids and triglycerides, valuable gasses and useable biomass products. Further, the present invention does not require pulse with or phase width modulation to produce exceptional results. Additionally, the present invention is readily adaptable to continuous production methods as opposed to more limited scale batch production methods.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a highly efficient means and method to produce large volumes of lipids and triglycerides that are readily converted to various fractions of useable fuels and oils.

It is another object of this invention to provide a highly cost effective method for producing bio-diesel, aviation jet fuel, bio-kerosene and heating oil.

It is still another object of the present invention to provide an algae based method and related apparatus to produce lipids and triglycerides as well as capturing products normally rejected as byproducts such as biomass useable for feedstock and valuable gasses.

An important object is also to reduce our dependence on foreign oil and the negative impact on the environment produced by conventional fossil fuels.

Another object of the present invention is to use water based algae growing mediums that do not cause any significant pollution or deleterious environmental effects.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
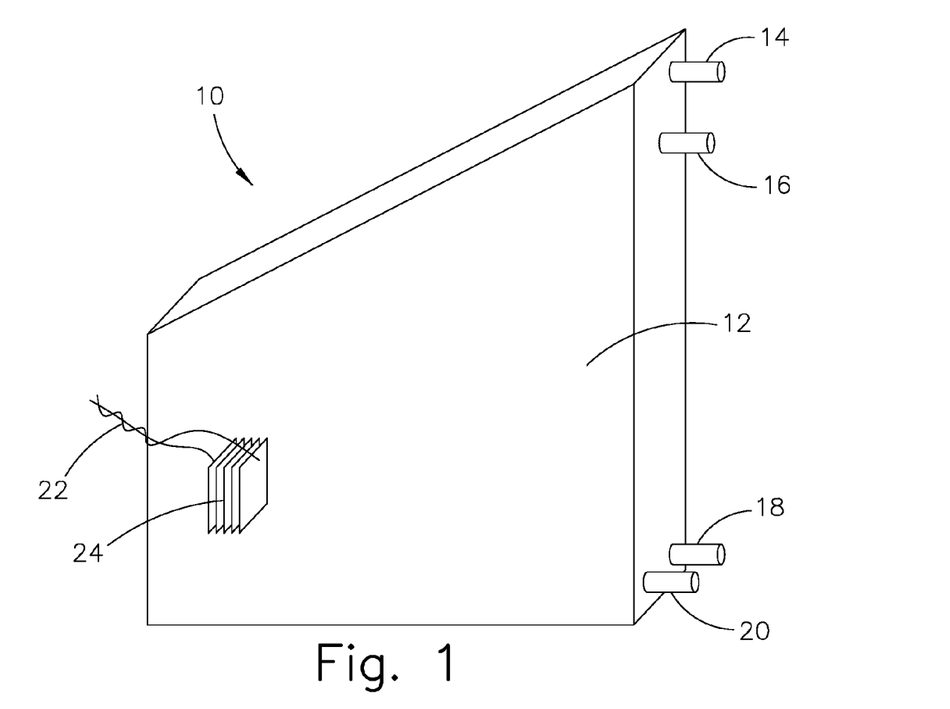
FIG. 1 represents a perspective view of an electrolysis reaction tank.

Referring now to the drawings, where the present invention is generally referred to in FIG. 1 with numeral 10, it can be observed that it basically includes a tank 12, a vent 14, a port 16, a drain 18, a port 20, leads 22 and plates 24.

Generally, in use the tank 12 is airtight and watertight and is partially filled with a water based solution, as described in more detail below. Port 16 is provided to remove accumulate oils from the tank 12. The water level in the tank 12 is typically at just below the height of the port 16 so that the oil floating on the water is exposed to the port 16 and can be removed from the tank permitting continued algae and oil generation.

The narrowing cross-section towards the top of the tank 12 acts to thicken the layer of oil floating on top of the water solution so that only the oil layer is removed. In other words, if the top of the tank did not narrow the oils floating on the surface might be only a thin layer. By narrowing the cross-section of the top and bringing the water level inside into the narrower portion then the depth of the oil layer can be increased and the port 16 will be immersed in the oil layer, removing only pure oil. A headspace between the top of the oil layer and top of the tank allows for the concentrated accumulation of gasses produced by the electrolysis process to be removed at the vent 14 without contaminating the vented gasses with the oils below.

The water must contain a predetermined level of naturally occurring algae suspended in a water solution in the tank 12. An electrolysis reaction is experienced by the contents of the tank 12 when direct current is applied via the leads 22 to the submerged plates 24. The resulting gasses from the electrolysis reaction are captured from the headspace above the level of the water at the vent 14. The gasses are then condensed outside of the tank 12.

Solid material, such as plant-matter is removed via the drain 18. Port 20 may be used as a supplemental drain means or to introduce additional water to the tank 12 for continuing the reaction and growth cycle of the contained algae.

Vent 14, port 16, drain 18 and port 20 each preferably have a valve to selectively limit or seal off the addition or removal of liquids, gasses or solids from the interior of the tank 12.

The profile of the tank 12 that reduces in size towards the top aids in the capturing of gasses produced by the electrolysis reaction and the algae. Notice the similar, alternate design in FIG. 3 to direct escaping gasses into vent 62. Other shapes could be equally effective and these drawings should be understood to be mere representative examples of tank profiles that can be used to concentrate the produced gasses.

Figure 3:
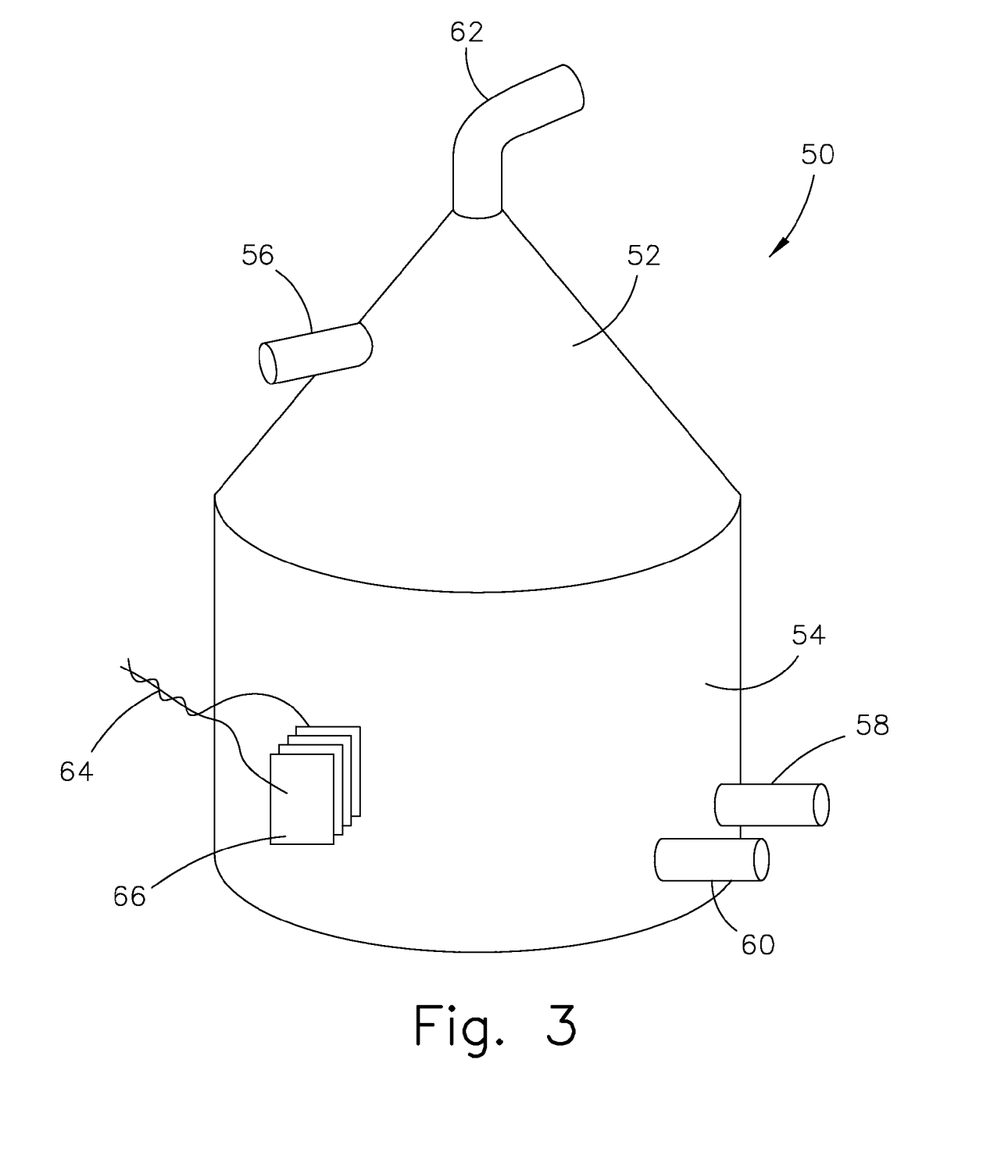
FIG. 3 illustrates a perspective view of an alternate reaction tank.
Figure 4:
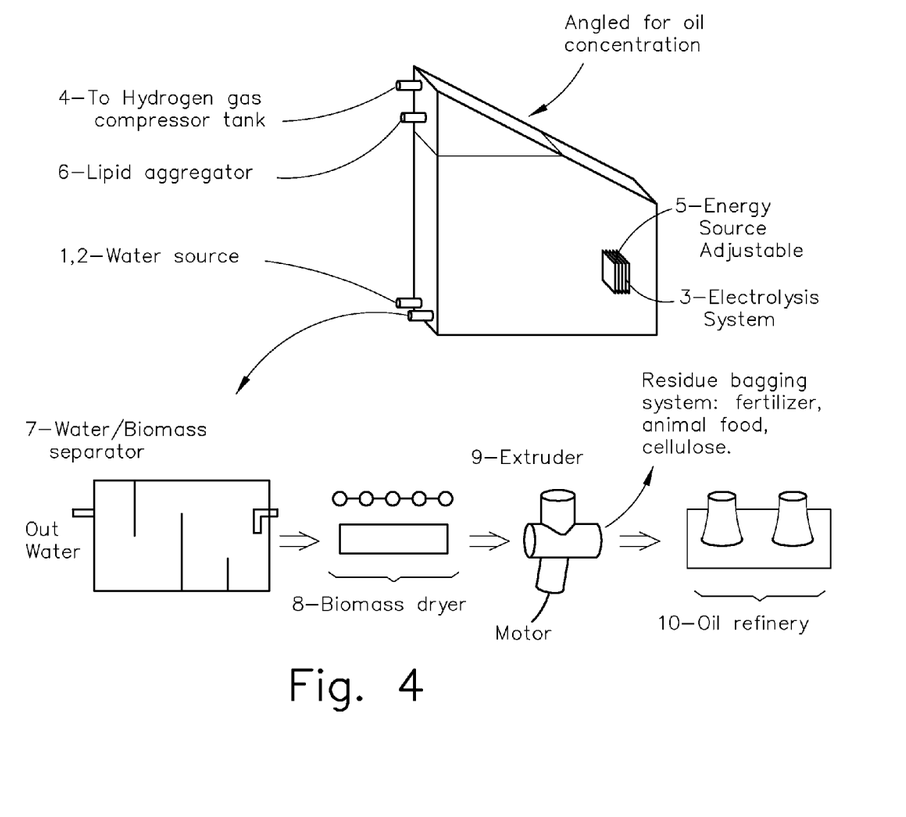
FIG. 4 is a flow chart of a preferred version of the process.

FIG. 3 shows an alternate configuration of the reaction tank 50 to include, inter alia, a collector 52, a tank 54, a port 56, a drain 58, a port 60, a vent 62, leads 64 and set of plates 66.

In use, the tank 54 contains a liquid medium, preferably water-based, that acts as a medium to grow algae and the algae itself in suspension. The tank 54 is filled via port 56 or via port 60 to re-supply the tank 54 with water and/or algae. A drain 58 can be used to reduce the volume of liquids and solids contained inside the tank 54. Port 56 can be used to remove lipids and triglycerides floating on the surface of the liquid inside.

Current is applied to the plates 66 via the leads 64 to initiate an electrolysis reaction. This reaction greatly increases the production of lipids and triglycerides by the algae contained inside the tank 54.

Similar to the slanted top of the tank design in FIG. 1, the cross section of the collector 52 reduces towards the top. The same volume of oil floating on the surface of the water is then deeper because of the reduced surface area over which it spreads. The port 56 is just above the top of the water solution level and thus positioned to capture and drain off the oil layer floating on top of the water solution. The gas vent 62 is above a headspace of gas produced by the electrolysis and removed from the tank 54 at vent 62.

Figure 2:
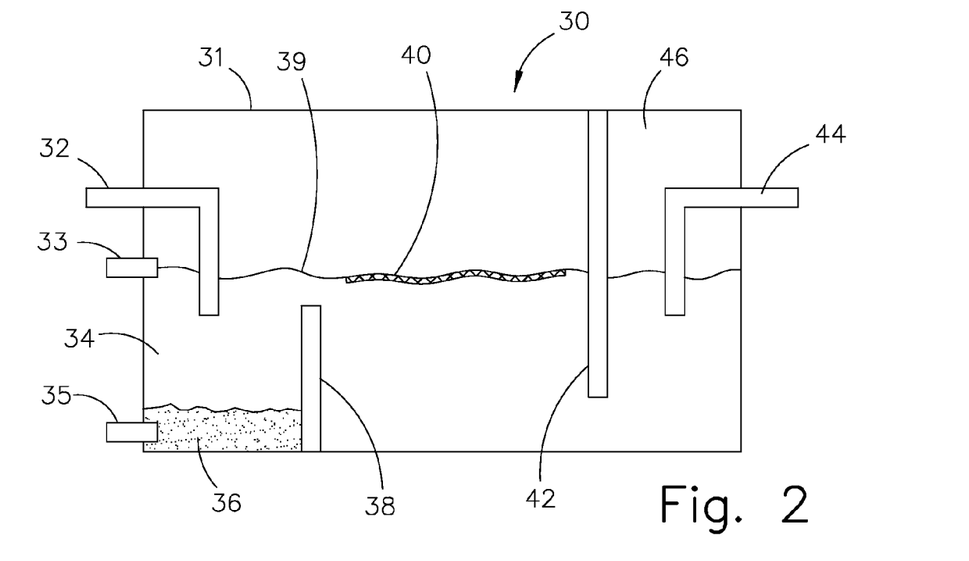
FIG. 2 shows an elevation view of a separation tank.

Now referring to FIG. 2 where a separation tank 30 is demonstrated to include a tank 31, a fill 32, a drain 33, a liquid 34 content, a drain 35, solids 36, a baffle 38, a surface 39, an oil 40 layer, a baffle 42, a drain 44 and a headspace 46.

The separation tank 30 is typically used secondary to the production done, for example, in the tank 12 in FIG. 1 or the tank 54 in FIG. 3. The water, algae and lipids are typically transferred to the separation tank 30 after the gasses have been reclaimed by pumping or draining into fill 32. The solids 36 are captured behind baffle 38 while the lighter liquid 34 and floating oil 40 pass over the baffle 38. The oils 40 are then held from discharge by baffle 42 and the remaining liquid, separated from the oil 40 and solids 36, is removed from the separation tank 30 via drain 44. The remaining solids 36 and oil 40 may then be recovered in their more concentrated state for use or further processing.

Drain 35 is preferably present to provide an egress for the solids 36 and permit continuous cycling of the separation process without disturbing the settling sediment. Drain 33 is at the surface 39 of the liquid 34 so that the oil 40, floating on the surface of the liquid 34, can be claimed and the separation process can continue practically indefinitely. Similarly, the drain 35 is provided to remove accumulated solids 36 while the separation process keeps processing. Drain 44 allows the volume of liquid 34 in the tank 31 to be regulated to ensure that the liquid 34 depth remains above the gap in baffle 38 and above the gap in baffle 42.

The separation tank 30 is but one example of various methods that could be effectively employed to isolate the oil 40, from the solids 36 and liquid 34. Other methods could include individually or combinations of centrifuges, filters, osmotic filtration, evaporation, exhaustive electrolysis or other known means.

The most abundant resource on earth is water. Waters containing algae and microbes have been tested effectively. Different water sources, such as seawater, rain water, well-water, lake water, pond water, streams, run off, non filtered pool water, and waste water have all been effective. Distilled water, city water, chlorinated water, and chlorinated water with fluoride also have been used. No use of special algae or microbes is needed. Cold, hot, salt or fresh waters all have sufficient naturally occurring microbes.

The present invention is a self-contained system which promotes the harvesting of algae from either salt water or fresh water sources inland or in open sea. The system processes algae at an accelerated rate and produces biomass for additional oil recovery and fertilizer stock.

Water containing algae and other microbes, when exposed in the system, separate lipids, water and biomass. This starts immediately within visual results in less than a few seconds. Lipids float to the top of the water mixture in massive amounts. The algae mass settles with water in between layers, a traditional naturally occurring separation caused by gravity. This process results in significant algae yield. The system is completely scalable and cost efficient.

The current obstacles bottlenecking the mass production of algae-based bio fuels are primarily centered on the costs necessary by using either large growing ponds or photo bioreactors to grow algae, which both require vast land resources and energy to operate. As such, the need for producing algae for bio fuel in a more efficient manner has become the focal point amongst laboratories and researchers.

Our specific process addresses these barriers directly by drastically reducing the costs of producing oil-rich algae by vastly reducing input resources. As such, the potential as it applies to the bio fuel industry is extraordinary. We have found a way to produce algae oil in vast quantities using minimal energy and land resources.

Lipids, sugars and proteins are obtained from the biomass. Biomass is de-watered in a cost effective low energy inventive system. The device achieves approximately two percent lipid production from every gallon that goes through our system, which is significantly higher that all other known production levels. Secondly, our system produces bio fuel at current prices of about $0.50 per gallon and algae oil at $0.10 per gallon. Presently significantly below the current market.

The algae industry is a rapid-growth industry that is low risk, environmentally safe, and a surging source of alternative renewable energy products from algae. Algae biomass has a wide spectrum of uses. It can be developed into feedstock and converted into biofuels and biobased products that include bio-crude, bio-jetfuel, bio-diesel, bio-gasoline, bio-ethanol, bio-methanol, glycerin, vegetable oil, bio-foods, bio-medicals, bio-plastics, bio-lubricants, bio-hydrogen protein for feedstock and other bio-based animal feed, fertilizer, sewage treatment, and co-products critical for human and ecological survival.

Algae consume carbon dioxide ($CO_2$), and like all plants release oxygen ($O_2$). They are vital to carbon sequestration, storage recycling with $CO_2$ reduction credits. Algae takes carbon dioxide out of the air for photosynthesis and turns it into fat (lipids and triglycerides) that can be used as oil; up to ninety-nine percent of which we can extract. A large number of companies and government agencies are funding efforts to reduce capital and operating costs and make algae fuel production commercially viable.

This method and apparatus allows any internal combustion engine to utilize the benefits of one of the following: vegetable oil, biodiesel, water containing algae and biomass, which may increase mileage while reducing emissions. This technology enables spark-ignited or diesel-type internal combustion engines and power generation systems to produce clean energy with near-zero carbon emissions, using proprietary technology, fuel cells, controllers and software.

Our system can also be used for cleaning up oil spills, providing feedstock for algae eating fish, mammals, clams, and mollusks. Additionally, we have developed a process that reduces radioactivity by as much as ninety-six percent.

Man's problem has been harvesting that which is naturally present in our environment and harnessing it without destroying the earth in the process, until now that is. This invention is a completely sustainable process of harvesting oil, biomass and other important, highly valuable products from the oceans and waters without harming wildlife or the delicate eco-system. We can produce algae oil faster and more cost effective than any other process.

The invention solves the problem of biomass production to achieve a sustainable energy solution.

Water solutions containing micro-organisms, such as algae, are exposed to low voltage electrolysis in an enclosed container or open system. When closed hydrogen, oxygen and other gases are captured and compressed for use in other biomass processing. Lipids are aggregated. Water and biomass are separated by specific gravity or other means. Biomass can then be dried, extruded into lipids and other useful products.

The current state of the art limits production of biomass to freshwater retained in an open membrane system. The present method and apparatus captures gas as created for industrial, medical, and energy conservation in a closed system. Salt acts as a catalyst in oceans and brackish water systems in the production of gases through electrolysis. The system is used in both fresh or salt water. The system is not limited to biofuels. It allows algae and micro-organisms to be captured and used for additional product such as feedstock, fertilizer, browns gas, hydrogen, oxygen and in addition oil and fuel production.

In addition the system can be integrated with existing facilities processing large volumes of water with existing infra structures. These include but are not limited to energy or water processing facilities such as nuclear, generation and co-generation, desalination, waste and fresh water, dams.

The invention is a combined biomass production and harvesting system. It is component and modular based system. It may be used as a single complete process or it can be divided into stages such as production, harvesting in or by component and final product completion.

A preferred variation of the system includes:

1. a water source, salt or fresh, containing algae, micro-organisms.

2. An adjustable water flow system capable of providing volume on demand manually or electronically controlled.

2. An electrolysis system matching the flow rate of water and allowing such time as required for Algae et al exposure to for lipid and biomass production.

4. If desired, an enclosed system for capturing and or compressing the gases produced by electrolysis for use or sale.

5. An adjustable energy power source capable or low or high voltage as required for biomass production.

6. A lipid aggregator.

7. An additional oil, water, biomass separator system.

8. Biomass dryer

9. Biomass extruder separator with oil capture system residue accumulator

10. Residue products bagging system.

11. Oil refinery system.

Elements of the system can be integrated into existing facilities processing high volumes of water such as elements 8, 9, 10 11, above, or a sub-combination thereof. Elements 1 through 6 or 1 through 7 can each be stand alone as desired.

All sources of water containing algae and mirco-organisms are different. There are many different forms of algae found in fresh water, pond, river, stream, brackish, or ocean. They are all different. Water may be cold or warm such as artic sea or Atlantic coast off Miami, Fla. This system uses whatever algae, biomass found in any water available except rain water, chlorinated water or distilled water, which lack significant natural algae. This process has world wide application. It uses whatever algae or microorganism available. Water access and availability also differ by country or border region. Afghanistan is land locked. It is limited to production based on limited water supply containing algae. Canada has the largest exposure to both fresh and salt water of any country.

The flow rate of water is matched to the desired exposure time for lipid and biomass production. Water temperatures range worldwide from 32 degrees f to 140 degrees F. We found that lipid separation can also be accomplished through temperature. Lipids freeze at 34 degrees F. above water at 32 degrees F. This is in addition to specific gravity and centrifuge methods.

Electrolysis breaks the bond of the algae cell membrane allowing release of lipids through the cell membrane. Electroporation is desired for maximum algae harvesting though not required. Electrolysis causes an immediate release of lipids and creation of visible and cohesive biomass by breaking the repulsive charge of algae in water. The water, when exposed to the electrolysis, also causes the release of hydrogen, oxygen, chlorine and ethanol vapors. These are captured, compressed and available for use to lower the energy footprint.

Lipids float to the top in electrolysis separation. The system design raises the water level to reduce the surface area and aggregate the lipids for easy and continuing separation. The biomass also floats to the top of the system. If allowed to settle the lipids remain on the surface of the water and algae bodies settle towards the bottom third of the enclosure.

The remaining water, lipid, biomass mixture is processed through a dryer. Water with lipids are recovered and separated for further processing. The dried biomass is now processed through and extruder providing additional algae oil and feedstock, fertilizer or cellulose which is now bagged or used in bulk.

Generally, the lipids are then filtered and used as a final product or refined into bio-fuels in as associated bio-diesel refining plant. To create jet fuel lipids are heated to approximately 500 degrees and reactants are added. The biomass can also act as a feedstock for cingas production facilities All components are fully integrated to complete a biomass production and harvesting system. Certain entities may have certain components that contribute to biomass production. In those instances the addition of our described components will complete a biomass production and harvesting facility under this application.

If desired this system with the addition of the following elements will allow almost 100 percent use of the initial water stream. These additional components include but are not limited to distillation for drinking water and specialty clean water, desalinated water, salt, water processed by reverse osmosis, steam for energy generation, water for cooling other process such as nuclear plant or co-generation plants, water flow for dams. This system when placed on a vessel or land based facility can be used to create of replenish fuel for engine, generator or other system that can use lipids.

The functioning of the system incorporates timers, sensors, chemistry testing, The operational system may larger or smaller. Voltage regulation integrated to computer and machine performance and function execution at all stages of operation.

All system dynamics are scalable. Each system is designed to provide the level of production desired or needed with the components required. The shape of pieces of equipment may vary. The design of the system and components remains constant. The processing tank must be grounded, built from material that can withstand pressure from the gases created. The gases are explosive. The system preferably has flash release valves for if an explosion may occur. Lipids by their nature are not explosive and require no special or storage handling.

What makes this system truly unique is it does not require retention ponds, long term or short term growth ponds, bio-reactors, or special algae. It strictly uses what algae or biomass that is available. Biomass yield is based on many factors. This biomass production and harvesting system address sustainability.

Gas production and storage, lipids produced and harvested, temperature control, pressure release, timing, energy control, water and biomass separation, integration to dryer, extruder, bio-fuel production and product bagging are all wholly or partially performed, implemented, or executed by a machine or computer.

The system produces hydrogen which can be used for vehicle or hydrogen applications. Oxygen produced can be sold for medical purposes. When hydrogen and oxygen are combined the combined gas is browns gas used in place of acetylene welding gas. Lipids created can be used as vegetable oil. The oil is equivalent to omega 3 oils for human consumption. The lipids are non-polluting when processed into bio-fuels with the same energy profile as diesel. The biomass, after extrusion, can be used as fertilizer, feed stock for animal or cellulose for paper. The desiccated salts can be separated for use in dies, paints, chemical products and human consumption.

Water can be filtered, debugged by ultraviolet exposure to create usable water. Water with high concentrations of salt can be used for aquariums. Salt water or remainder water can be used on dried land to reduce dust and erosion. The use of this system has many direct benefits.

The system may be attached in whole or in part to other water processing facilities including water cooling for nuclear reactors, water for steam generation and cogeneration facilities, water in the production of electrical energy, dams, desalination facilities and waste and clean water processing facilities. The addition of this system enhances the use of existing infra structure to produce lipids and other products for additional revenues with sustainable energy benefits.

Medical applications exist for petri dish growth media. The use of this type system reduces in size for medical applications increases the growth of organisms to shorten the time required for identification and processing.

Browns gas created by the system when combined with aluminum and iron and ignited become thermite. Thermite when exposed to radioactive substances reduces the radioactivity in excess of ninety (90%) percent in some dangerously radioactive materials thus having significant uses in radioactive safety.

The dryer may be also used for waste water slug processing. The subsequent extruder process for the remaining dried algae is similar to the process used to remove oil for nuts and soybeans.

Testing began by applying electrolysis using various different types of metals, in different thicknesses, sizes, and directions (horizontal, vertical, width), with positive, negative and neutral plate combinations, and varying spacing between plates to determine the optimal bubble size in the separation of water into hydrogen and oxygen.

Various waters containing algae and microbes were tested. We used different water sources, such as seawater, rain water, well-water, lake water, pond water, streams, run off, non filtered pool water, and waste water. We also tested distilled water, city water, chlorinated water, and chlorinated water with fluoride.

Water containing alkaline substances such as potassium hydroxide (caustic soda), baking soda, lye (sodium hydroxide), lemon juice, and water without alkaline substances added (just water—no additional substance) were tested. All of the variations to the plates which were connected to an electrical device for testing.

In testing metals, we found that a combination of aluminum and sodium hydroxide produced hydrogen gas. The relevant formula is:

$$2Al(s)+6NaOH(aq) \text{ converts to } 3H_2(g)+2Na_3AlO_3(aq).$$

Hydrogen gas is flammable, therefore you cannot mix lye (sodium hydroxide) and aluminum in a closed container, as it reacts with sugars to form carbon monoxide, a poisonous gas. Magnesium, brass, zinc, bronze and chromium when mixed with lye (sodium hydroxide) also produce hydrogen gas.

We discovered that by placing a plastic sheet over the area where the electrolysis was taking place, three additional results occurred:

First, the hydrogen and oxygen produced by the bubbling action could be harvested, run through a bubbler, and used in an engine (or stove) for fuel. Second, the heated lipid vapors condensed into ethanol. Third, when using salt water, the electrolysis process also produced chlorine.

It was also discovered that the surface area of the resulting solution containing the lipids was too large and too thin. We then began processing the mixture in an inverted funnel. See the collector 53 in FIG. 3 and the angled top of the tank 12 in FIG. 1. The large surface area was reduced to a small area that accumulated and concentrated the lipids, which allowed for easy removal and separation.

Getting the remaining lipids, triglycerides, sugars and proteins from the bio mass is done by cooking the mass and exploding the cells like kernels of corn. To do this economically, we use a solar cooker that concentrates the sun's power into a specific point in the heart of the bio mass. This solar cooker is shaped like a funnel.

The remaining bio mass is de-watered in large plastic drain bags (porous bags that let water pass through while retaining the solid algae cells) using gravity separation, and the lipids are separated by filter, specific gravity, and electrophoresis. The improved design includes a specific gravity separator. It is a new design as an additional patent in support of our system.

The results of the above are as follows: All waters containing algae and other microbes when exposed to the electrolysis system result in incredible algae growth and a separation of lipids and triglycerides. Lipids and triglycerides float to the top of the water mixture in massive amounts. The algae mass settles on the bottom with water in between it and the lipids.

Algae takes carbon dioxide out of the air for photosynthesis and turns it into fat that can be used as oil, up to 99 percent of which we can extract. A large number of companies and government agencies are funding efforts to reduce capital and operating costs and make algae fuel production commercially viable.

A self-contained system which promotes the multiplication of algae from either salt water or fresh water sources by using electrolysis as a feedstock. This process inspires a direct output of bio-diesel fuel as well as a significant raw algae yield which can be further processed into additional bio-fuel as well as other valuable resources.

In addition to inspiring a direct output of algal bio-diesel, the system generates massive raw algae biomass output that can be directly utilized as an agent for efficiently cleaning up oil spills.

We have developed a system that rapidly increases the algae content and production of bio-diesel fuel from algae found in seawater and other bodies of water. This system helps to overcome the cost obstacles implied by using growing ponds and bio-reactors by producing algae at a significantly greater growth-rate.

In our system, paramagnetic devices are powered by any conceivable power source to introduce hydrogen, oxygen, and metals to the algae as a feedstock. The application of this feedstock within the system inspires a massive algae bloom that creates enough bio-diesel to far exceed the required input energy needed to power the devices.

The system of paramagnetic devices can be configured in any number of ways for implementation into various bodies of water or closed water systems. The size, shape, and composition of the devices themselves can be adjusted to maximize the algae and bio-diesel output depending on the flow-rate and size of the water system. As such, the devices can be used to enhance algae growth in any context imaginable. All growers of algae can use this system to enhance growth in their systems of any nature.

Since the electrolysis process automatically releases a significant quantity of the biomass's lipid content during its application by breaking the algae cell walls, a simple filtration process can be used to easily separate most of the bio-diesel from the water during processing. Additional filtering along with specific gravity and magnetic separation are used to remove any additional materials and isolate the biomass.

In addition to producing an extremely high bio-diesel yield for use as fuel, the system's rapid algae output can be used to clean up oil spills in any body of water. The accelerated growth of algae can be used to literally attack oil, thus reducing its harmful effects on the environment. This system is unique in this nature, as such a process is dependant on an algae growth rate that has not been possible before our system's introduction.

The present invention relates to increasing the growth rate of algae for the creation of bio-diesel from seawater and other bodies of water that contain natural organisms. This system of rapid algae production can also be used to clean oil that has been spilled or found in any body of water. Furthermore, this system can be used to clean water of other contaminants.

In a preferred variation, the device is comprised of the following:

A device made from certain metals including but not limited to steel, copper, zinc, brass, nickel or any paramagnetic metal or oxide with posts for a positive and negative charge. One or many of these devices are attached to an electrical power source that can be run using battery power, generators, solar, wind, chemicals, human body pedaling, animals walking, change of air pressure, or turning of a propeller or rotor by tidal currents, waste water discharge, water gravity flow or gas through venturi system.

The devices can be configured in size to fit specific tasks or implementations. They can range in size from small—only inches in size, to huge—comparable to the size of the bottom ballast tanks of an aircraft carrier.

Multiple units can be attached to cables separated by a calculated formula of feet. The cable itself can be used to provide the positive and negative charge required to produce the creation of the feed stock.

The feedstock used to inspire algae growth consists of hydrogen, oxygen, and the paramagnetic metals that the devices are constructed with.

Power is supplied to the units to provide energy. This energy stimulates the production of hydrogen, oxygen, metals, and electrical and magnetic elements through electrolysis.

Buoys, boats, lines, power sources and people may work together to run such a self-contained system. Water quality monitoring helps to determine the width, breath, and the quantity of feedstock needed for any given application or use.

Multiple devices can be attached to a single line or multiple lines to form a system. These lines are set on reels that allow the unit(s) to be lowered and/or raised to the required depth in the water which is contingent on variables such as the current flow, tides, and wind conditions.

These lines are spaced apart at a distance determined by calculations that pertain to the specific application. For example, covering a 5,000 foot depth may require 1,000 or more units, or the connecting line itself may even be used as the paramagnetic device. To cover a 5,000 circumference may require 1,000 or more units, or the line itself may even be used as the paramagnetic device, arranged in a horizontal circle.

In any such formation, either the paramagnetic metal devices or the line/cable itself may be used to provide the positive and negative charges required to power the electrolysis process. This process generates a feedstock for the algae, supplying it with hydrogen, oxygen, certain metals, and their related electrical and magnetic properties. This feedstock causes the algae to grow and multiply at a dramatically increased rate. When the devices are applied to a body or container of water, the reaction produces a constant output of bio-diesel and other raw materials that can be used in other products.

A self contained system can be created with the device(s). In such a system, natural algae and other micro-organisms are pumped at an optimal flow rate into a feed tank and exposed to the devices, where the feedstock of hydrogen, oxygen, certain metals, and electrolysis causes a mass algae bloom. Paramagnetic magnets are tuned to up to 55 different frequencies in order to remove heavy metals.

Tank and pool sizes will vary in these self-contained systems depending on the specific usage and application. The size of the tank and flow rate determines the amount of exposure to the feeding stock. For example, an 11,200 gallon tank at a flow rate outbound at 525 gallons allows for 11 minutes of feeding, which is more than the time needed to create a significant yield. We have determined that 525 to 640 gallons per minute as an optimal flow rate for our system. This system is scalable.

The nutrient mass is separated by magnet into heavy metals, algae filtered, dewatered and caked for raw material for food stock and paper, bio fuels and water. The oil water separation removes all bio-fuels to less than 5 parts per million. 99.7% of all bio-fuel produced is captured and barreled or tanked on the spot.

Filtering is done as easy as lifting a liner, allowing gravity to do the work, tilting the containment field or compressing the bio mass by filling a bladder and compressing the mass.

The bio mass is removed after heavy metal elimination, then, specific gravity separation continues for bio fuel and water. Processing time for continual production is 11 minutes. Batch processing for 11,500 gallons is 22 minutes. Obviously, for varying power levels, sizes of tanks, concentrations of algae, temperature, atmospheric pressure and other variables can change these basic parameters used in the development of these values and are illustrative only.

Production of product, water quality, testing for state, federal and governmental compliance, output, integrated accounting and job costing are all monitored and controlled by computer.

The bio mass acts as a bubbler for gases produced. Hydrogen and Oxygen are collected from bubbles and used to power generators providing energy to the system or may be accumulated and sold as hydrogen, oxygen or browns gas depending on the mixture.

A hydrogen oxygen generation device is preferably provided. Any form of such a device can be used. However, for the device to achieve the level of success that we have achieved with the experimental device, the properties that are described are preferred. It requires certain spacing of the metals, the right combination of metals, controlled electrical current, a certain element of metal used in the feedstock process, magnetic induction, a particular bubble size, and a particular exposure time to feed stock and chlorine.

The metal device that produces the feedstock, hydrogen, oxygen, metals, electrical and magnetic energy, powered by an electrical source is the key to algae growth. It converts the algae allowing the algae to attack oil, sugars, etc at incredible rates. These algae are hungry for food, so they attack the oil and absorb it.

Continually feeding the algae with the hydrogen oxygen feed stock results in the creation of bio diesel. The application is important. Any device in the right ratios may apply.

Hydrogen oxygen production through electrolysis becomes the feed stock to the algae. This process grows the algae and causes fraction of the oil in the cell. When the algae attack, the heavy oil becomes lighter, and as a result, it's less harmful to the environment and more easily absorbed by organisms.

The entire process can be monitored by sensors and controlled by a computer. The computer can be used to raise or lower the equipment, adjust the buoys, increase or decrease electrical current, monitor electrolysis of metals, direct movement of units based on tides, wind or movement of a spill. In addition it monitors all systems including sugar production in the manufacture of bio-diesel.

This technology stimulates growth of organisms. It is applicable to growth of cultures in petri dishes for medical diagnosis. It can be used to accelerate growth for vaccines or other organic materials.

The useful byproducts may include: hydrogen as a fuel, oxygen for breathing, creating fresh water by removal of chlorine and particulate matter, form algae using this system: food stock for animals and people, cellulose for production of paper, replacement gas to propane, cooking apparatus (stove) that runs on water, heater that runs on hydrogen and oxygen produced from water, all produce able by pedal power, hand power, animal power, wind, solar, change in air pressure, change in tidal currents, wind, solar, electric or any fuel.

Being able to use the naturally occurring algae of the seas and any body of water to attack a spill is unique. This system can be moved with tides, current, the movement of the spill at any depth and any direction. In addition this is the first time that bio-diesel is produced in this manner. This system will allow other growers of algae for bio-diesel to accelerate growth of their developed strains, thus increasing production.

There is no competing deep water system that can be used to effectively control an oil spill other than this method. Current systems use surfactants to dissolve oil spills. Surfactants can harm wildlife and living organisms. This system allows natural living organisms to prosper and grow. The oil becomes a feed stock for the algae thus rendering the oil harmless. This system is an improvement of bio diesel production from algae. Closed systems that use sugar as a growth media or an open pond are also possible. Tube systems using direct and indirect sun light all benefit from the introduction of hydrogen, oxygen, certain metals, electrical and magnetic inducement through a device. It increases production at accelerated rates. Minutes verses days in growth.

Our system is applicable for use in all desalination facilities, cogeneration facilities worldwide today. Our systems can be completely standalone, tied into a cogeneration facility, power generation facilities such as dams, desalination facility, and a bio diesel manufacturing plant adding lye and methanol to create a final product.

Desalination facilities separate the water from algae and discard the algae material. We process the discarded material by use of extruder for removing oil. Chemicals are optionally used for drying to remove salt. The remaining product is fertilizer and cellulose.

Where desired, the intensity of the electrolysis can kill the algae to release oil instead of growing the algae and biomass and processing by extruder.

As used herein, sea water contains dissolved salts such as NaCl and is denser than freshwater. It is the preferable source of water. Water included salt, brackish, fresh, ponds, stream, river, lake, or waste. The system is specifically design to cause the release of lipids upon exposure to electrolysis. Electroporation is desired. The system may use any voltage application. Low voltage is desired. Pulse width modulation is not required.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A method for collecting algae and microbe generated lipids comprised of:
   introducing a water into a tank to a depth at a lipid port and below a vent;
   said water is sourced from any of a seawater, a fresh water, a brackish water or a waste water;
   said water has naturally occurring microbes and algae;
   said tank is narrower in an upper section than at a bottom end;
   applying a regulated electrolysis charge to said water inside the tank sufficient to result in the separation of lipids from said algae;
   said tank having the lipid port positioned in said upper section at a depth to remove a floating layer of said lipids;
   said tank having a drain near a lowest point that periodically discharges accumulated sediment;
   said tank having a vent near a highest point adapted to collect gasses produced by reactions inside said tank;
   said lipid port in liquid communication with a separator device to further isolate the lipid from any remaining water solution.

2. A method as disclosed in claim 1, further characterized in that said separator device may be any of a gravity separator, a centrifuge, an evaporator, an osmotic filter or a physical filter.

3. A method as disclosed in claim 1, further characterized in that said lipid is further processed into any of a fuel, a lubricant or a fertilizer.

4. A method as disclosed in claim 1, further characterized in that said sediment is further processed into a fertilizer or animal feed.

5. A method as disclosed in claim 1, further characterized in that said gasses are collected and retained for use or further refinement for use as a fuel.

6. A method as disclosed in claim 1, further characterized in that the regulated electrolysis charge is non-pulse width modulated.

7. A method for collecting lipids comprising:
   a tank that has a narrower cross-section at an upper section of the tank than at a bottom end of the tank;

a lipid port integral to said tank at a first depth in said upper section of the tank;
a headspace inside said tank is above the lipid port;
a vent integral to said tank is positioned above the lipid port so that a gas in the headspace can be selectively removed from the tank through the vent;
a drain at the bottom end of the tank;
introducing a water into a tank at a predetermined flow rate;
said water selected from any of: a naturally occurring seawater, a naturally occurring freshwater, a naturally occurring brackish water or a waste water;
said water contains a naturally occurring algae;
apply an electrolysis charge to said water inside said tank sufficient to result in a separation of a lipid from said algae and microbes;
said lipid floats on a surface of the water inside the tank;
a water level in said tank does not exceed said first depth and when said water level is at said first depth said lipid flows out of said tank through the lipid port;
the drain is selectively operated to flush a sediment from the bottom end of the tank.

8. A method as disclosed in claim 7, further characterized in that after the lipid flows out of the tank through the lipid port, the lipid is further processed by a separator device;
said separator device may be any of a gravity separator, a centrifuge, an evaporator, an osmotic filter or a physical filter.

9. A method as disclosed in claim 7, further characterized in that said lipid is further processed into any of a fuel, a lubricant or a fertilizer.

10. A method as disclosed in claim 7, further characterized in that said sediment is further processed into a fertilizer or animal feed.

11. A method as disclosed in claim 7, further characterized in that said gasses are collected and retained for use or further refinement for use as a fuel.

* * * * *